Figure 1:
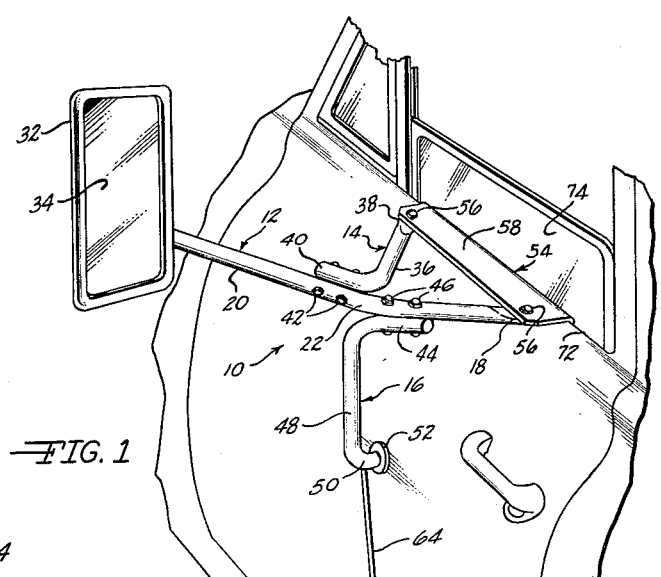

March 9, 1965    L. E. ALLEN    3,172,633
REAR VIEW MIRROR
Filed Sept. 5, 1963

INVENTOR
LEA E. ALLEN
BY Beaman Beaman
ATTORNEYS

United States Patent Office 3,172,633
Patented Mar. 9, 1965

1

3,172,633
REAR VIEW MIRROR
Lea E. Allen, 588 S. Parma Road, Parma, Mich.
Filed Sept. 5, 1963, Ser. No. 306,888
7 Claims. (Cl. 248—226)

The invention pertains to a vehicle rear view mirror, and particularly relates to a rear view mirror which may be easily attached to or removed from the associated vehicle.

When pulling a trailer with an automobile, particularly a trailer of considerable vertical dimension such as a house or travel trailer, it is necessary both from a practical and a safety standpoint to employ an exteriorly mounted rear view mirror. Such rear view mirrors are normally mounted on the side of the vehicle and provide the greatest degree of visibility when the mirror is located 12 inches or more from the vehicle side. Additionally, when pulling a trailer it is of advantage to employ a mirror of considerable area dimension, whereby improved rear vision is obtainable as compared with that usually provided with conventional, small rear view mirrors employed with passenger vehicles.

As passenger vehicles usually transport trailers for only short periods of time, for instance, several weeks in the summer during a vacation camping trip, or the like, the passenger vehicle owner is reluctant to invest in the commercial type heavy-duty mirror used with trailer-hauling vehicles such as found on trucks. Additionally, the passenger vehicle owner is reluctant to mount a conventional, large rear view mirror on his vehicle, in that mounting holes and brackets are required which necessitate considerable modification to the vehicle, which would adversely affect its resale value. Thus, the passenger vehicle owner who desires to pull a trailer must either permanently attach a large commercial type mirror to his automobile to provide adequate rear view vision, or be satisfied with a small, conventional rear view mirror which does not provide adequate rear vision for safe trailer usage.

It is an object of the invention to provide a rear view mirror of relatively inexpensive construction which may be very quickly and easily attached to or removed from a passenger vehicle without requiring modification to the vehicle. The rear view mirror, in accord with the invention, is of such construction as to provide adequate rear vision when pulling a trailer and positions the mirror at a maximum permissible distance from the vehicle as to provide maximum visual characteristics.

Another object of the invention is to provide a vehicle rear view mirror which may be used when pulling a trailer wherein the mirror is very easily adaptable to a wide variety of makes and models of passenger vehicles, requiring no modification and inflicting no damage on the vehicle.

A further object of the invention is to provide a rear view mirror of such size as to permit adequate rear vision when pulling a trailer with a passenger vehicle, and of such construction as to be easily disassembled for shipping purposes.

An additional object of the invention is to provide a rear view mirror which may be very quickly attached to or removed from a vehicle and is installed on the vehicle with biasing means, whereby a vibrationless support of the mirror on the vehicle is produced.

2

Figure 5:
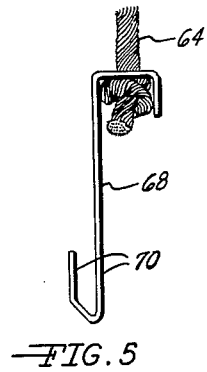
Figure 4:
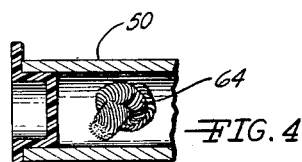
Figure 6:
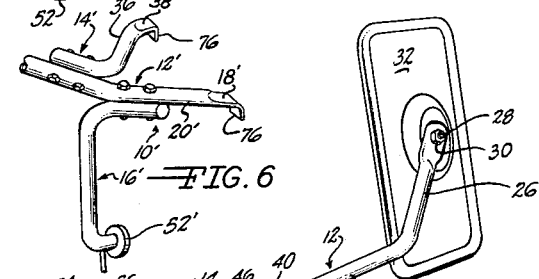
Figure 2:
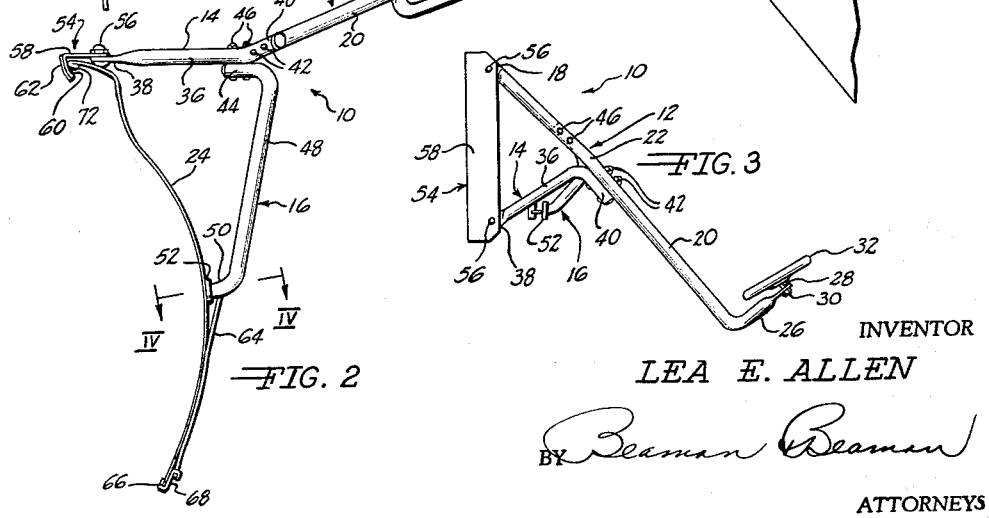
Figure 3:
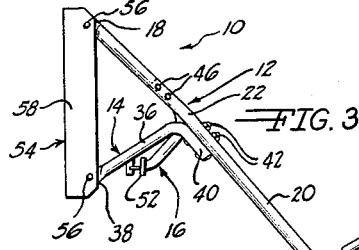

These and other objects of the invention arising from the details and relationships of the components of an embodiment thereof will be apparent from the following description and accompanying drawings wherein:

FIG. 1 is a perspective view of a rear view mirror constructed in accord with the invention as mounted on a vehicle, FIG. 2 is a front, elevational view of the rear view mirror of the invention, illustrating the vehicle outer door panel and association of the mirror structure therewith, FIG. 3 is a plan view of a rear view mirror in accord with the invention, FIG. 4 is an enlarged, detail, plan, sectional view of the mirror door abutment portion as taken along section IV—IV of FIG. 2, FIG. 5 is an elevational, end view of the lower door edge engaging clip, and FIG. 6 is a detail, perspective view of an embodiment of the mirror support member.

The support member 10 for the mirror, in accord with the invention, consists of three formed elements 12, 14, and 16. The elements are preferably constructed of tubular stock and may be plated or painted to present an attractive appearance. The element 12 is provided with an inner end 18 which has been pressed into a substantially planar configuration, and is bent at 22 to include an extension portion 20 extending away from the vehicle door 24. The extension portion 20 is turned upwardly and outwardly at portion 26, and is provided at its outer end with a stud 28 affixed thereto by a nut 30. The stud 28 preferably includes a ball connection wherein the ball of the stud is received within a socket formed in the mirror framework 32. A mirror 34 is mounted within the mirror framework. It will be appreciated the mirror framework 32 is of a relatively large dimension, permitting a large area mirror to be encased therein.

The support member element 14 is of an L-shaped configuration, having a portion 36 terminating in a substantially planar end 38. The shorter leg 40 of the element 14 is provided with bolt holes, as is the extension 20, whereby the elements 12 and 14 may be bolted together by bolts 42, FIG. 1.

The support member element 16 includes a portion 44 provided with holes, whereby bolts 46 may affix the element 16 to the element 12. The portion 48 of the element 16 extends in a downward direction, with respect to the element 12, and terminates in an inwardly turned portion 50. The end of the portion 50 is provided with a plastic or rubber pad 52 which is partially received therein and affixed thereto. The pad 52 engages the exterior of the vehicle door 24 and prevents the portion 50 from marring the door finish.

A formed plate 54 is attached to the ends 18 and 38 of the elements 12 and 14, respectively, by means of bolts 56. The plate 54 is of a formed configuration including an upper planar portion 58 and a downwardly depending flange portion 60. Felt pads 62 may be affixed to the inside of the flange portion to prevent rattling of the flange against the vehicle door window.

An elongated member 64 is affixed at its upper end to the element portion 50 and is attached at its lower end to the lower door edge 66. As will be apparent from FIG. 4, the tension member 64 may be inserted through a hole defined in the portion 50 and knotted at one end within the portion 50. The lower end of the tension member is attached to a shaped clip 68, including a U-shaped portion 70 adapted to grip the lower door edge 66. While the tension member 64 could consist of any type of tension spring means, preferably, the tension member is in the form of a shock cord having a core of rubber or similar material encased within a fabric sheath.

In assembling the rear view mirror of the invention to a vehicle, it is merely necessary to insert the flange portion 60 of the plate 54 between the upper vehicle door edge 72 and the window glass 74 of the door, and extend the tension member 64 so as to place the lower door edge 66 within the U-shaped portion 70 of the clip 68, thereby maintaining the extension of the tension member. It will be appreciated that the normal length of the tension member 64 is less than the distance between the lower door edge 66 and the portion 50. The mirror is now completely installed and in an operative condition. The biasing force imposed on the support member 10 by the resilient member 64 maintains the abutment pad member 52 in firm engagement with the outer surface of the vehicle door, and also maintains the flange 60 down over the upper door edge 72. The operator may adjust the mirror framework 32 on its ball-and-socket connection to provide optimum rear vision. As the flange is very narrow, the flange does not interfere with the operation of the vehicle window 74, nor does the clip 68 interfere with closing of the vehicle door. The constant biasing pressure imposed on the support member by the tension member 64 prevents the support member from vibrating relative to the vehicle door, and a firm connection between the vehicle door and the mirror is obtained.

A slight variation to the embodiment of FIGS. 1, 2, and 3 is illustrated in FIG. 6. In this embodiment the components similar to those previously described are indicated by primes. As will be apparent from FIG. 6, the flattened end portions 18' and 38' of the elements 12' and 14', respectively, may be turned downwardly to define a flange 76 which functions as the equivalent of the flange 60 defined on the plate 54. Thus, the flanges 76 may be inserted over the upper vehicle door edge to connect the support member 10' thereto, and the use of a plate interconnecting the portions 18' and 38' is not required. As the portions 18' and 38' are spaced apart a considerable distance, a three-point interconnection between the mirror support member and the vehicle body is produced which will provide the same firm connection to the vehicle door as the embodiment of FIGS. 1, 2, and 3.

If it is desired to employ a rear view mirror with the right vehicle door, identical inventive concepts are employed and variations need only be made in the configuration of the elements 12, 14, and 16, to adapt the mirror of the invention to this position of the vehicle.

In some vehicle door constructions the forward portion of the door is provided with a horizontally extending ledge in front of the door window structure. This ledge is to accommodate the "dog leg" occurring in many vehicles employing a "wrap-around" windshield. With this type of vehicle door it is possible to place the plate 54 and flange 60 over the "dog leg" ledge, rather than the upper door edge disposed adjacent the side window. The clip 68 is associated with the lower door edge in the illustrated manner.

It will be understood that various modifications to the disclosed embodiment may be apparent to those skilled in the art without departing from the spirit and scope of the invention, and it is intended to define the invention only by the following claims.

I claim:

1. A rear view mirror for use with vehicles having a door having an upper edge, a lower edge, and an outer surface intermediate said upper and lower edges comprising, in combination,
   (a) a support member having attachment means defined thereon adapted to be placed over the door upper edge,
   (b) door surface engaging means defined upon said support member and spaced from and below said attachment means adapted to engage the outer surface of the door,
   (c) resilient means interposed between said support member and the door lower edge biasing said support member toward the vehicle door lower edge maintaining engagement of said attachment means with the door upper edge and maintaining engagement of said door surface engaging means with said door outer surface, and
   (d) a mirror mounted on said support member.

2. In a rear view mirror as in claim 1, wherein
   (a) said resilient means biasing said support member toward the vehicle door lower edge comprises a tension spring member interposed between said support member and the vehicle door lower edge.

3. In a rear view mirror as in claim 2, wherein
   (a) said tension spring member consists of an elastic cord.

4. A vehicle rear view mirror comprising, in combination,
   (a) a support member,
   (b) a mirror mounted on said support member,
   (c) said support member including a pair of spaced portions extending away from said mirror and an elongated upper vehicle door edge engaging portion interconnecting said spaced portions,
   (d) vehicle door abutment means defined on said support member spaced from said door edge engaging portion,
   (e) tension means having first and second ends, said first end affixed to said support member, and
   (f) anchor means affixed to said tension means second end.

5. A vehicle rear view mirror comprising, in combination,
   (a) a support member,
   (b) a mirror mounted on said support member,
   (c) at least two spaced upper vehicle door edge engaging means defined on said support member,
   (d) vehicle door abutment means defined on said support member spaced from said door edge engaging means,
   (e) tension means having first and second ends, said first end affixed to said support member, and
   (f) anchor means affixed to said tension means second end.

6. A vehicle rear view mirror comprising, in combination,
   (a) a support member,
   (b) a mirror mounted on said support member,
   (c) said support member including a pair of arms each having a terminating end, the terminating ends of said arms being relatively spaced,
   (d) a formed upper vehicle door edge engaging plate interposed between said terminating ends,
   (e) a flange defined on said plate angularly disposed thereto,
   (f) an elastic tension member having first and second end portions,
   (g) one of said tension member end portions being affixed to said support member,
   (h) a vehicle lower door edge engaging clip affixed to the other end portion of said tension member, and
   (i) vehicle door abutment means defined on said support member spaced intermediate said vehicle upper door edge engaging plate and said vehicle lower door edge engaging clip.

7. A vehicle rear view mirror adapted to be removably mounted on a vehicle door of the type having an upper edge, a lower edge and an outer surface defined intermediate said edges, characterized by its ease of mounting upon and removal from the vehicle door comprising, in combination, (a) a support member,
(b) a mirror mounted upon said support member,
(c) upper door edge attachment means defined on said support member adapted to overlie the upper door edge and engage the upper door edge at at least two spaced locations,
(d) vehicle door engagement means defined on said support member spaced from and below said attachment means adapted to engage the door outer surface,
(e) resilient spring means having an upper portion and a lower portion, said upper portion being affixed to said support member, and
(f) lower door edge attachment means defined on the lower portion of said spring means.

References Cited by the Examiner
UNITED STATES PATENTS

| | | | |
|---|---|---|---|
| 943,299 | 12/09 | Corson et al. | 248—328 X |
| 2,302,300 | 11/42 | Davies | 224—29 |
| 2,473,698 | 6/49 | Aves | 88—98 |
| 2,518,538 | 8/50 | Giblin | 248—226 X |
| 2,545,777 | 3/51 | Hardin | 248—279 |
| 2,860,546 | 11/58 | Bolser | 88—98 |
| 3,013,754 | 12/61 | Hastings | 248—226 |
| 3,081,057 | 3/63 | Farnsworth | 248—226 |
| 3,114,530 | 12/63 | Shilling | 248—226 |

CLAUDE A. LE ROY, *Primary Examiner.*
JEWELL H. PEDERSEN, FRANK L. ABBOTT,
*Examiners.*